United States Patent [19]
Thelamon et al.

[11] Patent Number: 5,169,130
[45] Date of Patent: Dec. 8, 1992

[54] HYDRAULICALLY DAMPED BUSHINGS

[75] Inventors: Jean Thelamon, Bonneval; Paul Schwartz, Chateaudun, both of France

[73] Assignee: Hutchinson, France

[21] Appl. No.: 638,817

[22] Filed: Jan. 8, 1991

[30] Foreign Application Priority Data

Jan. 9, 1990 [FR] France .................. 90 00163

[51] Int. Cl.$^5$ .................................. F16F 13/00
[52] U.S. Cl. .................. 267/140.12; 267/141.2
[58] Field of Search ............ 267/140.1 C, 219, 35, 267/141.2, 141.3, 141.4, 141.5, 141.6, 140.1 A

[56] References Cited

U.S. PATENT DOCUMENTS

| | | | |
|---|---|---|---|
| 4,632,370 | 12/1986 | Ticks et al. | 267/219 |
| 4,690,389 | 9/1987 | West | 267/140.1 C |
| 4,790,520 | 12/1988 | Tanaka et al. | 267/141.2 |
| 4,834,351 | 5/1989 | Freudenberg et al. | 267/141.2 X |
| 4,893,798 | 1/1990 | Hiba et al. | 267/140.1 C |
| 4,895,353 | 1/1990 | Roth et al. | 267/140.1 C |
| 4,907,786 | 3/1990 | Okazaki et al. | 267/140.1 A |
| 4,923,178 | 5/1990 | Matsumoto et al. | 267/140.1 C |
| 4,982,938 | 1/1991 | Bremer | 267/140.1 C |
| 5,013,012 | 5/1991 | Jouade | 267/140.1 R |

FOREIGN PATENT DOCUMENTS

| | | | |
|---|---|---|---|
| 3910570 | 10/1989 | Fed. Rep. of Germany . | |
| 2624235 | 12/1988 | France . | |
| 0126453 | 5/1989 | Japan | 267/140.1 C |
| 2200190 | 7/1988 | United Kingdom . | |

Primary Examiner—Robert J. Oberleitner
Assistant Examiner—Peter M. Poon
Attorney, Agent, or Firm—Larson and Taylor

[57] ABSTRACT

A hydraulically damped bushing comprising two tubular bodies surrounding each other and joined with each other by an elastomeric member so designed as to form two sealed cavities communicating with each other by a narrow channel, the cavity-channel assembly being filled with a liquid, whereas the portion of said member which defines one of the cavities consists of a tight bellows whose edges are attached sealingly onto the external body. This bushing further comprises, within said defined cavity, a second tight bellows which is sealingly attached onto the external tubular body, the inner volume of said second bellows being vented to the open air through an aperture bored into said body.

13 Claims, 1 Drawing Sheet

HYDRAULICALLY DAMPED BUSHINGS

BACKGROUND OF THE INVENTION

This invention relates to hydraulically damped bushings comprising two rigid tubular bodies surrounding each other, at least a portion of said bodies being preferably generated by revolution, said bodies being concentric and coaxial at least when loaded, whereas an elastomeric member, which may be possibly a monolithic block, is mounted between said bodies, said elastomeric member being so shaped as to form with said bodies at least two sealed cavities which are diametrically located in opposite relationship along a direction D and communicate with each other by means of a narrow channel, the assembly consisting of said sealed cavities and channel being filled with a damping liquid.

Bushings of this kind are well known and intended to be mounted between two rigid members which may be coupled to said tubular bodies and able to be subjected, with the respect to each other, to oscillations oriented along the diametral direction D, the assembly being arranged in such a manner that, when at least certain oscillations are applied thereto, the liquid is alternately forced back from one sealed cavity to another and conversely through said narrow channel, thus providing for a given frequency of said oscillations (said frequency having a value F properly related to the size of the channel) a resonant effect which enables the transfer of said oscillations from one tubular body to the other to be damped.

The related rigid members could be, for instance, on the one hand a vehicle chassis, and, on the other hand, the internal combustion engine, the rear axle assembly or the front axle assembly of said vehicle.

The invention more particularly relates to, among the aforesaid bushings, those in which the portion of the elastomeric member, which defines at least one of the sealed cavities consists of a flexible tight diaphragm or bellows whose edges are attached in a tight manner onto the external tubular body (see U.S. Pat. No. 5,013,012).

The related cavity, so called "compensation cavity", is used for recovering with a large flexibility the variable volumes of liquid which are forced into said cavity from the other cavity, so called working cavity, and the related bellows does not substantially work for transmitting any load or other stresses from one of the rigid members to the other one, said transmission being achieved by a thick radial compression-withstanding portion integral to the elastomeric member and defining the working cavity.

Due to the relatively thin wall thereof, the bellows thus related is relatively flimsy and the fatigue behavior thereof may be limited when the bushing is subjected to cyclic oscillatory stresses of great amplitude, particularly when submitted to high extension strains.

That results in a reduced life period as regards the bushings provided with bellows of said type.

It is an object of this invention to obviate this disadvantage and thus to increase the life period of said bushings.

To this end, the bushings of the related type according to the invention are essentially characterized in that they comprise, within the cavity defined by the aforesaid bellows, a second tight bellows sealingly attached to the external tubular body, like the first one.

In the preferred embodiments, provision is made for any one of the following features:
- the inner volume of the second bellows is vented to the open air through an aperture bored into the external tubular body;
- the bellows defining outwardly the compensation cavity has the shape of a strap which is transversely extending and bulged toward the bushing axis and the second bellows is similarly arranged within said cavity;
- the transverse cross-section of the strap forming the second bellows has the shape of a U or V especially having a flat bottom, the two legs and/or the bottom of which may be themselves corrugated.

Further the invention comprises, in addition to the aforesaid main features, certain peculiar features which could be preferably used simultaneously and which will appear more clearly on reading the following description.

The accompanying drawings show an exemplary embodiment of this invention, in which.

Figure 1:
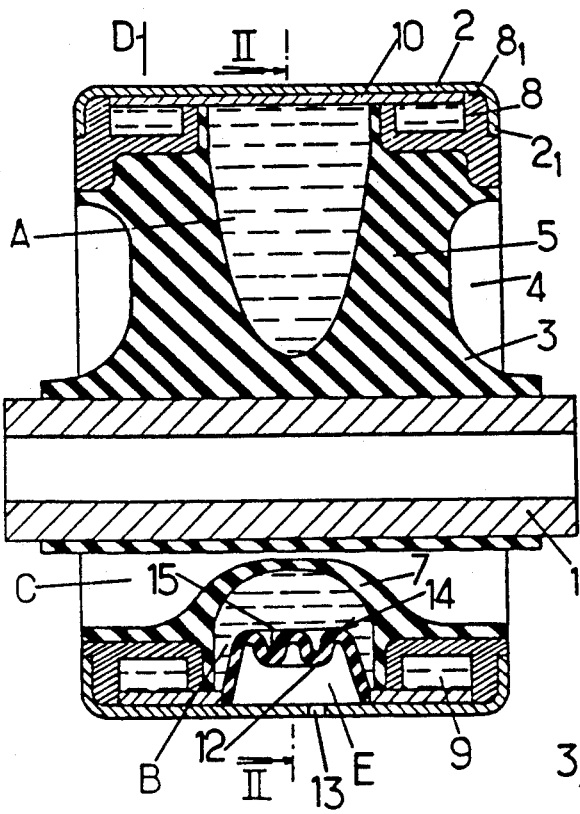
FIG. 1 is an axial cross-sectional view according to line I—I in FIG. 2, showing a hydraulically damped bushing according to the invention.
Figure 3:
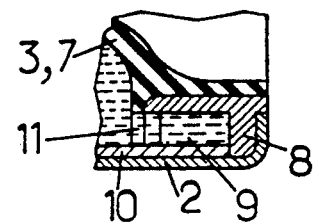
FIG. 3 is an axial partial cross-sectional view of the bushing illustrated in FIGS. 1 and 2, taken along line III in FIG. 1.

The related bushing comprises:
- an internal tubular metallic body 1 which is shaped as made by revolution;
- an external tubular metallic body 2 which is shaped as generated by revolution and surrounds body 1 and, as the bushing is fitted and loaded, may be in coaxial relationship with said body 1, the axes of both bodies being in any case in parallel relationship with each other when the bushing is at the rest position; and
- an elastomeric body 3 intended to bond both metallic bodies 1, 2 with each other, while providing between the latter two sealed cavities A, B which are diametrically located in opposite relationship with each other along the direction D in FIG. 1.

The internal metallic body 1 is so designed as to be secured to a pin (not shown in the drawings) which contiguously passes through said body, whereas the external metallic body 2 is so designed as to be secured to a journal (not shown in the drawings), said pin and said journal being respectively secured to two rigid members between which it is desired that an antivibration support be mounted, e.g. members such as either a motor or a suspension arm for any vehicle and the chassis of said vehicle as well.

A portion of said elastomeric body 3, which, by way of illustration, is merely supposed to be herein the top half-part thereof, has, when loaded, a configuration partially shaped as generated by revolution about the axis common to both metallic bodies 1 and 2, and having an axial U- or V-shaped half-section, whereas two grooves 4 facing the outside of the bushing are provided as recesses in both front surfaces of said portion respectively.

Figure 2:
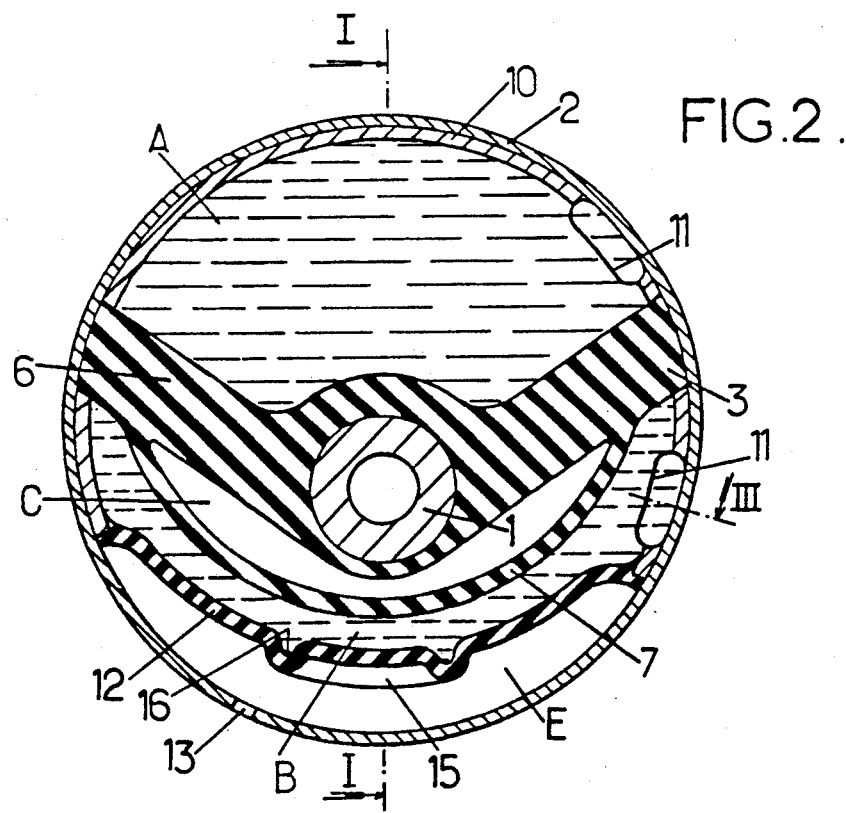
FIG. 2 is a transverse cross-sectional view according to line II—II in FIG. 1.

Said portion also comprises two radial arms 6 which are either diametrically opposed or extending as to form a widely opened V, as can be seen in FIG. 2, said arms defining together with surfaces 5 and external metallic body 2 a chamber A.

The portion of elastomeric body 3 which defines the chamber B consists of a thin tight flexible bellows or diaphragm 7.

This bellows 7 is shaped as a strap which extends as an arc of circle and is bulged with respect to the axis. This strap is provided with two semi-circular edges which are sealingly secured to the external metallic body 2, whereas both ends of said strap are affixed to said radial arms 6, while providing between said arms 6 and said bellows 7 a cavity C which is axially opened to the open air.

Two circular sections 8 are attached to both axial ends of the external metallic body 2 inside the latter as to form together with said body two narrow circular channels 9.

In the embodiment shown in the drawings, each section 8, when shown in axial half-cross-sectional view, is shaped as a U which is radially opened towards the external area and comprises a disk 8 which slightly projects towards the external area and is crimped between an inwardly folded flange $2_1$ of an axial end of external body 2 and the opposite end rim of a cylindrical sleeve 10 working as a brace, and contiguously inserted within said body 2.

Said sleeve 10 contiguously surrounds the portions of the sections 8, which are limited by the edges of both disks $8_1$ on purpose to sealingly close said sections radially with respect to the external area.

This sleeve is not continuous along the whole peripheric length thereof, but consists of two curved parts or tiles between which are located the ends of arms 6, as illustrated in FIG. 2.

As can be also seen in FIG. 2, each of both channels 9 is sidely or laterally connected to ports 11 provided in both chambers A and B, respectively.

When operating the above described bushing, oscillations are applied along direction D on one of tubular bodies 1 and 2 with respect to each other, thus resulting in an alternative flushing of a certain volume of liquid through narrow channel 9 from one of said sealed cavities A and B to another and conversely.

When the frequency of said oscillations is equal to a predetermined value, the liquid column which is subjected to go-and-fro motions in channel 9 is the center of a resonant effect, and as a result the relative oscillations are efficiently damped or filtrated.

The thin flexible wall constituting the bellows 7 is subjected to a permanent extension stress due to the pre-load providing the mutual centering of both tubular bodies 1 and 2, said pre-loading resulting in a liquid backflow from cavity A to cavity B.

The aforesaid oscillations properly result in variations of the degree of the permanent extension stress, said variations being able to attain a great amplitude when the afore-mentioned resonance is present.

This wall 7 may be quickly overstrained and as a result the life period thereof could be reduced.

As to obviate this disadvantage, provision is herein made within sealed cavity B between bellows 7 and the portion of external tubular body 2 which is inwardly covered by said bellows 7, for a second bellows or diaphragm 12 which is thin and tight and whose edge is sealingly attached to the inner surface of said external tubular body 2, the chamber E defined by said second bellows and said body 2 being vented at the open air through a bore 13 provided in said body.

The second bellows 12 is herein properly provided with the same shape as the first bellows 7, i.e. that of a bulged strap whose middle line and both longitudinal edges extend along arcs of circle having an axis which is that of the external tubular body 1.

The cross-section of said strap is selected as to enable said strap to be collapsed against the inner surface of the external tubular body 2 by means of the liquid pressure in sealed cavity B.

Thus said cross-section may be that of a reverse U each leg of which could be made easily corrugated due to the folded shape thereof, especially a V- or W-shape.

Further said cross section may be that of a reverse V having a bottom or top 14 substantially "flat" or rather cylindrical with generatrices parallel to the axis of tubular body 2, as illustrated in FIG. 1, said bottom being possibly hollowed out towards tubular body 2. In the embodiment shown in the drawings, the bottom 14 is provided with two grooves 15 extending in parallel relationship to the middle line of the strap, said grooves being possibly so designed as to join each other through two grooves 16 extending in parallel relationship to the axis of the bushing, thus resulting in a closed loop.

Either the stiffness or the flexibility of the second bellows 12 is selected such that, with respect to that of the first bellows 7, the pressure loadings of the sealed cavity B by means of the liquid initially result in a progressive collapse of the second bellows 12, the air contained in chamber E being evacuated through port 13, whereas the extension stress is only applied to the bellows 7 at the time when the related pressure becomes higher than a threshold level which is substantially high.

Particularly the major part of the permanent overpressure due to the pre-loading of the bushing is absorbed by said deformation of the second bellows.

This state of facts enables the life period of the bellows to be widely increased for the following reasons:
the life period of an elastomeric wall is largely greater in case of compression stress than in case of extension stress applied to said wall;
the size, shape and constitutive elements of the second bellows may be selected at will and particularly as regards bellows 7 which has been cast together with the remainder of the elastomeric body 3, involving thereby some special requirements as to enable the demolding process to be carried out.

Obviously the liquid pressure lowering in sealed cavity B automatically results in a re-swelling of second bellows 12 which recovers the initial shape thereof whereas a new air volume is admitted in chamber E.

Subsequently and whatever may be the procedure embodied, it is finally provided a hydraulically damped bushing whose construction, operation and advantages would result from the foregoing.

Obviously and taking into account the foregoing statements, it will be recognized that the invention may be otherwise variously embodied and practiced. In particular other modifications within the scope of a person skilled in the art also form part of the spirit of the invention. Thus, according to another alternative embodiment of the invention, the first elastomeric bellows 7 could be made independently from the part of body 3 which defines working chamber A, this first bellows being possibly made integral with second bellows 12 or associated with the latter by pre-assembling said members before they have to be mounted together within tubular body 2. Further the internal volume of second bellows 12 could be not vented to the open air, that could be the case when the bushing is located into a continuous journal member.

What we claimed is:

1. A hydraulically damped bushing comprising an internal rigid tubular body and an external rigid tubular body surrounding said internal tubular body and including, disposed between said bodies, an elastomeric member which is so shaped as to form with the bodies at least two tight cavities which are diametrically located and communicate with each other through a narrow channel, the assembly comprising said cavities and said channel being filled with a damping liquid, the portion of the elastomeric member which defines at least one of said tight cavities comprising a tight flexible elastomeric bellows whose edges are sealingly attached to said external tubular body, and said bushing further comprising a second elastomeric bellows which also defines the tight cavity defined by said portion of the elastomeric member and is sealingly attached to the external tubular body.

2. A bushing as set forth in claim 1, wherein the internal volume of the second bellows is vented to the open air through an aperture bored within the external tubular body.

3. A bushing as set forth in claim 1, wherein the first bellows has the shape of a strap which transversely extends to and is bulged toward the bushing axis, the second bellows being so shaped and directed as well.

4. A bushing as set forth in claim 3, wherein the transverse cross-section of the strap constituting the second bellows has the shape of a U having both respective legs corrugated.

5. A bushing as set forth in claim 3, wherein the transverse cross-section of the strap constituting the second bellows has the shape of a U having a flat bottom.

6. A bushing as set forth in claim 5, wherein the flat bottom of said U is hollowed out in the direction of the external tubular body.

7. A bushing as set forth in claim 6, wherein the flat bottom of said U is provided with two grooves extending in parallel relationship to the middle line of the strap.

8. A bushing as set forth in claim 7, wherein the two grooves are joined by two other grooves which extend in parallel relationship to the bushing axis as to form together with the previous grooves a closed loop.

9. A bushing as set forth in claim 3, wherein the transverse cross-section of the strap constituting the second bellows has the edge of a V having both respective legs corrugated.

10. A bushing as set forth in claim 3, wherein the transverse cross-section of the strap constituting the second bellows has the shape of a V having a flat bottom.

11. A bushing as set forth in claim 10, wherein the flat bottom of said V is hollowed out in the direction of the external tubular body.

12. A bushing as set forth in claim 11, wherein the flat bottom of said V is provided with two grooves extending in parallel relationship to the middle line of the strap.

13. A bushing as set forth in claim 12, wherein the two grooves are joined by two other grooves which extend in parallel relationship to the bushing axis as to form together with the previous grooves a closed loop.

* * * * *